United States Patent Office 3,015,238
Patented Jan. 2, 1962

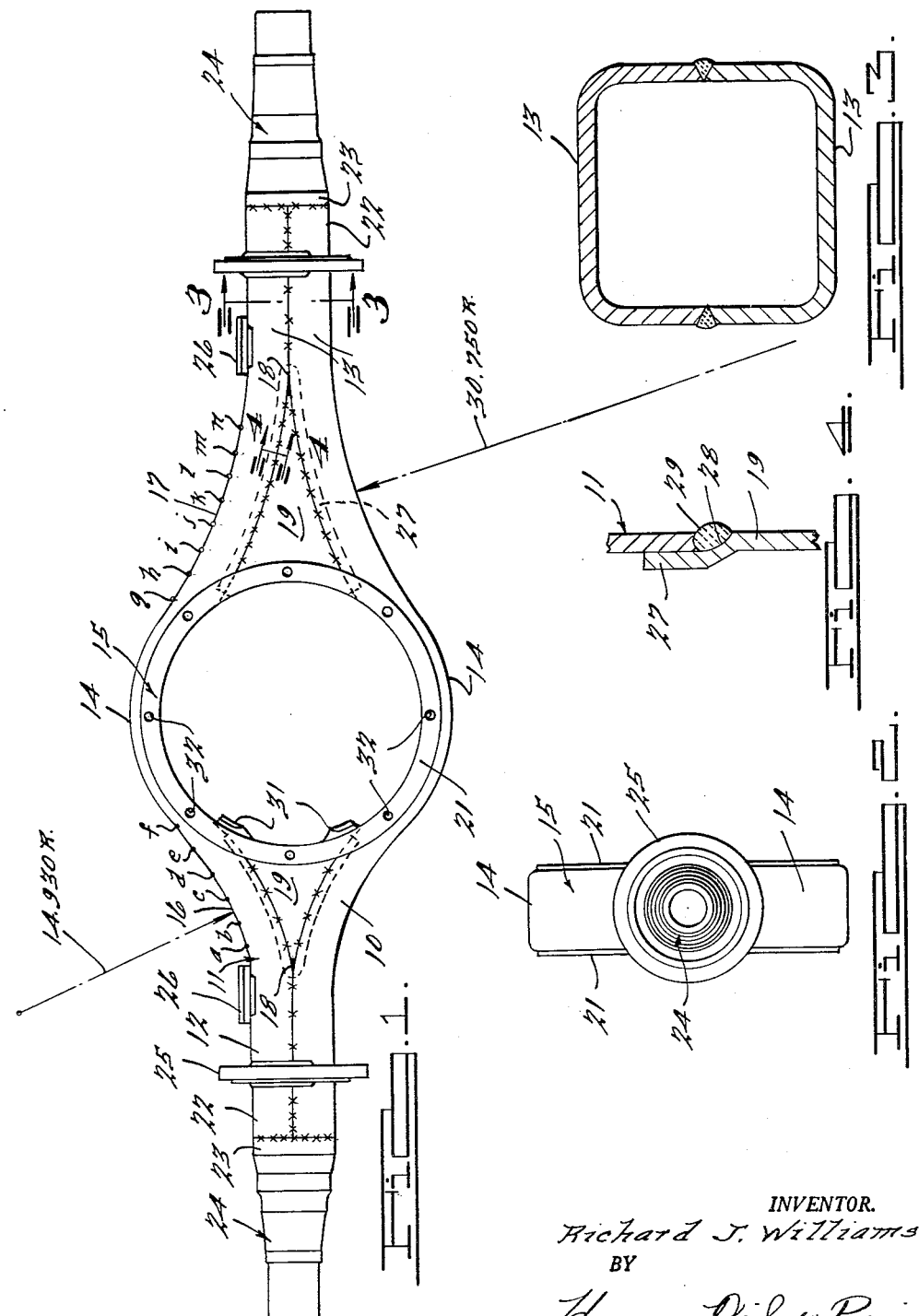

3,015,238
AXLE HOUSING
Richard J. Williams, Birmingham, Mich., assignor, by mesne assignments, to Eaton Manufacturing Company, Cleveland, Ohio, a corporation of Ohio
Filed Dec. 10, 1959, Ser. No. 858,722
9 Claims. (Cl. 74—607)

This invention relates to axle housings, and particularly to a prestressed axle housing and the method of construction.

In the past, it has been the practice on heavy trucks to make axle housings from seamless tubing which had one end hot-forged to form a spindle and the opposite end expanded to form one-half of a banjo housing provided at the center of the axle housing. Two of the parts so formed were then butt-welded at the banjo housing halves to form a circular banjo housing in the center of the assembly, with spindles at the opposite ends thereof. Spring pads were provided between the hub and the banjo housing which supported the spring load of the body and which therefore applied to load directly to the cylindrical tube portion between the central banjo housing and the spindles. Because the maximum stress was applied at the tubular portion of the axle housing, the tubular members from which the housing was constructed required heavy walls to withstand fatigue strains to which they were subjected.

In the R. J. Williams Patent No. 2,752,673, portions of an axle housing which formerly were of cylindrical cross section between the banjo housing and the spindles were made square to provide flat sides which were parallel to the applied load. The strength provided to the housing was substantially increased and thereby permitted the thickness of the tubular wall to be substantially reduced, which permitted a much thinner walled tube to be employed in the construction. Not only did this reduce the thickness of the cylindrical wall and the cost of the two lengths of tubing employed in the axle housing construction when made of seamless tubing, but also permitted the use of cheaper resistance welded tubing which still further reduced the cost of the tube blanks which theretofore were of the seamless type because of the required heavy wall thickness.

In practicing the present invention, an axle housing is constructed of facing like channel elements, portions of which are bowed outwardly to form a banjo housing between a short and long tubular end portion. Gusset plates fill the space between the channel elements adjacent to the banjo housing and complete the circular shape thereof. The end sections of the channel elements are welded together to form the tubular end portions, the square shape of which is changed to a circle at the ends. Spindles are separately forged or otherwise constructed to have circular ends which are aligned with and welded to the circular ends of the end portions of the assembled channel elements. Brake flanges and spring pads are welded to each of the end portions of the welded channel elements in the conventional manner. The assembly is set after being upwardly bowed and is then forced downwardly and set to have the center of the banjo housing disposed a predetermined distance above a horizontal line through the spindles. When so prestressed, a memory point is provided to which the center of the banjo housing returns after the load is removed. When the spring pads are loaded, the housing will be downwardly deflected and the center of the banjo housing will be disposed substantially upon the horizontal line through the center of the spindles. This substantially reduces the wear on the gears within the banjo housing and upon the bearings therewithin and within the spindles. With the banjo housing shifted off center between the spindles, equal deflection of both sides thereof will occur when the arcuate throat portion at the side of the banjo housing adjacent to the short end portion is struck from a shorter radius than the radius of the throat portion adjacent to the longer end portion.

Accordingly, the main objects of the invention are: to provide an axle housing having the banjo portion thereof offset between the end portions and stressed upwardly and then downwardly to have the center thereof disposed above the center line through the ends; to form an axle housing with an offset banjo portion which has equal deflection adjacent to the short and long end portions thereof by producing unequal support at the arcuate throat portions which are struck on different radii; to form an axle housing from presenting channel elements which are welded together at the ends and expanded outwardly at the center to form portions of a banjo circle, the other portions of which are completed by gussets filling the space between the flanges of the channel elements, the welded end portions being blended to a circle to which the circular ends of spindles are welded, and, in general, to provide an axle housing which is prestressed to have the center fall upon the center line through the spindles when loaded and which has a banjo portion which is uniformly deflected, all of which is simple in construction and economical of manufacture.

Other objects and features of novelty of the invention will be specifically pointed out or will become apparent when referring, for a better understanding of the invention, to the following description taken in conjunction with the accompanying drawing, wherein:

FIGURE 1 is a view in elevation of an axle housing embodying features of the present invention;

FIG. 2 is an end view of the axle housing illustrated in FIG. 1;

FIG. 3 is an enlarged sectional view of the structure illustrated in FIG. 1, taken on the line 3—3 thereof, and FIG. 4 is an enlarged sectional view of the structure illustrated in FIG. 1, taken on the line 4—4 thereof.

The axle housing of the present invention is made of two like channel elements 10 and 11 which are presented toward each other, with the side flanges welded together at the end portions 12 and 13. An arcuate portion 14 is formed in each of the channel elements to provide sections of a banjo portion 15 which is located to the left of center so that the end portion 12 is substantially shorter than the end portion 13. The throat portion 16 adjacent to the short end portion 12 has a shorter radius than the throat portion 17 adjacent to the long end portion 13. In one construction, by way of example, the throat portion 16 had a 14.930" radius, while the throat portion 17 was struck on a radius of 30.750".

The channel elements are so constructed as to have the end portions 12 and 13 square in section, as illustrated in FIG. 3, with the corner radii varying along the throat and the adjacent end portions 12 and 13. For example, in the construction above referred to, the section A of the channel elements has corner radii of 6.6", that of point B, .92"; that of point C, 1.210"; that of point D, 1.440"; that of point E, 1.400", and that of point F, .85". Along the throat of the longer end portion 13, the section at the point G has radii of .720"; that of point H, 1.240"; that of point I, 1.460"; that of point J, 1.400"; that of point K, 1.200"; that of point L, .990"; that of point M, .790"; and that of point N, .640". On the axle housing upon which these radii were actually utilized, the points were spaced 1½" apart as measured between vertical planes.

The areas provided between the flanges of the channel elements 10 and 11 where they separate from the point 18 to the circle of the bajo portion 15, are closed by gusset plates 19 which are secured in place when welded to the flanges of the channel elements 10 and 11. Each side of the flanges of the channel element and the gusset plates at the side of the banjo portion has reinforcing rings 21 welded thereto and machined to provide flat faces and a circular opening. The end area 22 of each of the end portions 12 and 13 is shaped to blend into circular end sections which abut circular end sections 23 of spindles 24 which are formed or otherwise constructed to have the desired shape for receiving the axles in a manner well known in the art and disclosed in the above mentioned patent.

Washerlike brake flanges 25 are welded to the square section of the end portions 12 and 13 and spring pads 26 are welded to the top of the end portions in the conventional manner. The pads support the springs of a chassis frame and the load which will be applied thereto will be transferred by the housing to the wheels. The substantial strain which is placed upon the housing by the load causes a predetermined downward deflection of the center of the bajo portion which results in wear on the gears and the bearings associated therewith. After the axle housing is completed, a load is applied to stress the housing upwardly and produce a set beyond a desired amount, after which a load is applied downwardly to cause the housing to take a set when the central point of the bajo portion is located a predetermined distance above the center line through the spindles. This distance is such that when the housing has been deflected downwardly under load the center of the banjo portion will have moved down into coincidence with the center line of the spindles. The same advantage is obtained by machining the banjo portion with the center above the center line of the spindles so that the side gears of the differential will be above the center line through the spindles. There will be no excess strain on the teeth of the differential gears when the axle housing is deflected under load and the wear thereon and on the axles and bearings will be reduced to a minimum.

The resistance against unequal deflection is attributed to the square section at the end portions of the housing, the different radii of the arcs of the throat portions between the banjo and the end portions, and the variation of the radii at the corners of the rectangular and channel sections along the throat and adjacent end portions. The upward setting of the housing beyond the lower desired point and the setting of the housing thereafter to the desired point have the advantage of changing he point of memory to the latter point so that when the housing is deflected downwardly under load it will always return to the last set or memory point. If this were not done and the setting occurred through the upward movement only, the memory point would be that from which it was deflected upwardly and the housing would soon set under load to the initial point.

The use of the short radius for the arcuate throat portion disposed adjacent to the short end portion and the use of the substantially longer radius for the arcuate throat portion adjacent to the long end portion equalize the support for the banjo housing between the short and long end portions so that the deflection, when it occurs, will be equal at each end portion. With such equal deflection, the banjo housing will return to the point to which the center was set, when the load is removed therefrom and the uneven wear which occurred because of the uneven deflection of the axles and differential parts is avoided.

The gusset plates 19 have an offset flange 27 disposed about the edges which is adjacent to the flanges of the channel elements 10 and 11. The flanges 27 abut the inner face of the channel flanges, with the central portion thereof aligned with the outer faces thereof. The V-shaped space 28 between the channel flanges and gusset are filled with weld material 29 which is burnt into the metal thereof to provide 100% penetration and solid strength along all portions of the weld. The overlapped flanges prevent the welding material from burning through the metal as would occur if the edges were abutted.

One or both of the gusset plates at the rear face of the housing has integrally extending fingers 31 provided thereon for engaging the housing of the differential device which is inserted to within the inner banjo area from the front of the axle housing. This locates the case and side gears of the differential within the axle housing centered on the center of the banjo opening. The case and side gears will deflect and be aligned with the axles when the axle housing is deflected under load to have the center of the banjo portion disposed on the center line through the spindle 11. The ring 21 has a plurality of threaded apertures or studs 32 by which the closure element of the banjo portion is secured in sealed relation thereto.

What is claimed is:

1. An axle housing made from sheet material to have a banjo portion offset from the center between the ends of the housing to have a short portion and a long portion at opposite sides of the banjo portion, and an arcuate throat section extending from each side of the banjo portion, the throat section on the short end portion being struck on a smaller radius than the throat section on the long portion.

2. An axle housing made from sheet material to have a banjo portion offset from the center between the ends of the housing to have a short portion and a long portion at opposite sides of the banjo portion, and a throat section between the banjo portion and the housing ends, the throat section on the short portion sloping at a greater angle to the center line through the ends than the throat section on the long portion.

3. An axle housing made from sheet material to have a banjo portion between the tubular end portions of the housing, the center of the banjo portion having a memory point above the center line through said end portions obtained by first setting the housing by an upward deflection above the memory point and then setting the housing by a downward deflection to said memory point.

4. In an axle housing made from sheet material to have a banjo portion located between tubular end portions, the center of the banjo portion having a memory point disposed above the center line through the end portions, and spring pads on said end portions to which the load is applied that deflects the housing to have the center of the banjo portion substantially coincide with said center line.

5. The method of forming an axle housing from sheet material which includes the steps, of providing a circular banjo portion between tubular portions of different lengths, of forming arcuate throat sections between the banjo portion and the ends of the housing, and of forming the arc of the throat section on the shorter portion with a shorter radius than that forming the arc on the longer portion.

6. An article of manufacture built up from elements of sheet material which are welded together, some of the elements being disposed in the same plane with the adjacent edge portions overlapping, an offset edge portion of one element being disposed in face to face relation to the adjacent element leaving a groove between the end of the last said element and the section which connects the offset edge portion to the portion of the element which is disposed in extension of said end, and welding material filling said groove and penetrating into the metal forming the walls thereof.

7. In an axle housing having a banjo portion and aligned tubular end portions, said housing being made from facing channel elements which are joined at the ends and extended outwardly therebetween to form the banjo portion, gusset plates filling spaced-apart portions of said elements and extending to the opening in the banjo portion, and at least one extension on the edge of one or more of said gusset plates which projects into said opening to locate the housing of the differential unit therein when the unit is inserted within the banjo portion.

8. In an axle housing, a pair of facing channel elements secured together at the ends and diverging inwardly different angular amounts, and ring means joining said elements at the diverged portion to form a banjo housing having oppositely extending short and long portions forming different throat sections, the throat section on the short portion being struck on a smaller radius than the throat section on the long portion.

9. An axle housing made from channel elements and gussets have a banjo portion offset from the center between the ends of the housing to have a short portion and a long portion at opposite sides thereof, said channel elements facing each other and being joined at the ends and progressively spread apart toward the banjo portion providing angular openings for the gussets, the angle formed by the channel elements to provide the openings being smaller on one side of the banjo portion than on the other.

References Cited in the file of this patent
UNITED STATES PATENTS

| | | |
|---|---|---|
| 1,243,398 | Fries | Oct. 16, 1917 |
| 1,311,343 | Goljan | July 29, 1919 |
| 1,451,401 | Murray et al. | Apr. 10, 1923 |
| 1,534,605 | Murray | Apr. 21, 1925 |
| 2,303,266 | Getting | Nov. 24, 1942 |
| 2,569,452 | Buckendale | Oct. 2, 1951 |
| 2,674,783 | Schneider et al. | Apr. 13, 1954 |
| 2,752,673 | Williams | July 3, 1956 |